United States Patent [19]

Wada et al.

[11] Patent Number: 4,889,886
[45] Date of Patent: Dec. 26, 1989

[54] LIQUID CRYSTAL POLYESTER COMPOSITION

[75] Inventors: Mitsuo Wada; Toshio Kanoe, both of Fuji; Takayuki Ishikawa, Shimizu, all of Japan

[73] Assignee: Polyplastics Co., Ltd., Osaka, Japan

[21] Appl. No.: 127,404

[22] Filed: Dec. 2, 1987

[30] Foreign Application Priority Data

Dec. 10, 1986 [JP] Japan ................................. 61-294426

[51] Int. Cl.⁴ .......................... C08K 7/14; C08K 7/06; C08K 3/34
[52] U.S. Cl. ..................................... 524/449; 524/605
[58] Field of Search .................. 252/299.01; 528/176; 523/212, 213, 214; 428/1; 524/444, 605

[56] References Cited

U.S. PATENT DOCUMENTS 4,067,819 1/1978 Daimon et al. ...................... 106/417
4,540,737 9/1985 Wissbrun et al. ................... 528/176
4,803,235 2/1989 Okada .................................. 524/605

Primary Examiner—Theodore Morris
Attorney, Agent, or Firm—Birch, Stewart, Kolasch & Birch

[57] ABSTRACT

A liquid crystal polyester composition comprising 99.5 to 30 percent by weight of a polyester being melt-processable and being capable of forming the anisotropic phase in a melt state and 0.5 to 70 percent by weight of a plate-like filler and is improved in resistance to deformation.

21 Claims, 1 Drawing Sheet

LIQUID CRYSTAL POLYESTER COMPOSITION

BACKGROUND OF THE INVENTION

1. Field of the Invention

The present invention relates to thermoplastic resin composition which are low in molding shrinkage and in thermal deformation, have excellent surface characteristic, high strength and low deformation and is suitable as molding materials for plastic molded articles which have complicated shapes and must have high accuracy, e.g., components of electronic appliances, such as pickup parts of a compact disk player and ferrules of optical fibers.

2. Description of Related Art

A group of plastics, the so-called engineering plastics, are replacing metallic parts by virtue of their high strength. However, most of the plastics called engineering plastics have a molecular structure known as crystalline polymeric structure, so that they have a disadvantage of large so-called molding shrinkage. It is a present situation that, in a practical use, the disadvantage is somewhat compensated for by appropriately setting molding conditions, particularly the design of a mold.

In general, in order for a polymer to be a material having high strength, it is desirable that the polymer be a crystalline polymer having ordered molecular arrangement. Since, however, changes in the state of such a polymer from a molten state to a solid state means changes in its form from an amorphous form to a crystalline form, it is impossible to solve a fundamental problem that the volume change of the polymer is inevitably larger than that of a noncrystalline polymer. The fact that the balance between deformation and properties is particularly important in this case makes it difficult to solve the problem.

The currently used materials will now be reviewed from this point of view. An unfilled resin exhibits relatively large molding shrinkage and small stiffness. On the other hand, a composition containing a particulate material is small in molding shrinkage, and is low in strength as well. Further, a composition containing a fibrous material is high in both strength and stiffness, but tends to exhibit a large molding shrinkage. Therefore, it is quite difficult to improve the stiffness and strength without causing an increase in the molding shrinkage. Particularly, it is a current situation that no satisfactory compositions are found with regard to crystalline resins.

However, in recent years, the development of a thermotropic liquid crystal polyester which exhibits anisotropy in a molten state changed the whole situation. Since this liquid crystal polyester melts while maintaining the crystalline structure, the resulting moldings advantageously have a combination of high strength derived from its crystalline structure with a small difference in the volume between a molten state and a solid state, i.e., a small molding shrinkage, attributable to the fact that the crystalline structure does not significantly change when it is solidified. However, this also has a drawback. Namely, although the absolute value of the molding shrinkage factor is small, the difference in the molding shrinkage factor between the direction of resin flow and a rectangular direction during molding, i.e., the anisotropy in the molding shrinkage factor, is large, which makes it difficult to obtain precision moldings.

Figure 1:
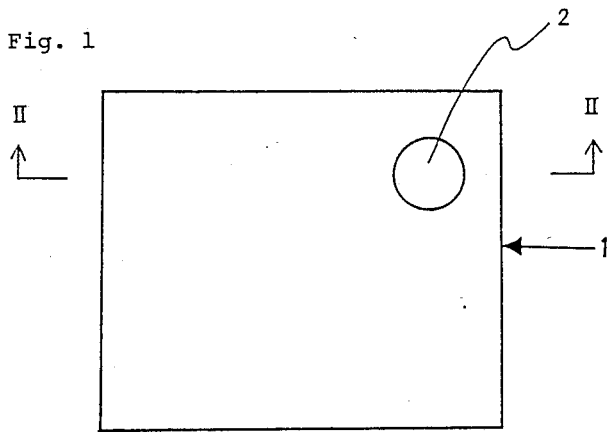
FIG. 1 is a plan view of a specimen for measuring molding shrinkage which was used in the present invention.

1 ... gate
2 ... hole for use in measurement of roundness

SUMMARY OF THE INVENTION

The present inventors have made various studies on molding shrinkage phenomena exhibited by a newly developed melt-processable polyester capable of forming an anisotropic melt phase (hereinafter abbreviated to "liquid crystal polyester"). As a result, the present inventors have found that although the liquid crystal polyester is smaller in molding shrinkage than that of other resins, the molding shrinkage cannot be neglected in the case of precision moldings because of large anisotropy of the molding shrinkage. In view of the above, the present inventors have studied the solution to the problem through the incorporation of another material and as a result, have found that sheet powder is effective in suppressing the molecular orientation of the liquid crystal polyester and serves as a filler which can provide the best balanced properties and that particularly a combined use of a fibrous material with the sheet powder provides molded articles having well-balanced properties in respect of strength and deformation, which led to the completion of the present invention.

Specifically, in accordance with the present invention, there is provided a liquid crystal polyester resin composition comprising 99.5 to 30% by weight of a melt-processable polyester capable of forming an anisotropic melt phase and 0.5 to 70% by weight of sheet powder.

The present invention provides a liquid crystal polyester composition which comprises 99.5 to 30 percent by weight of a polyester being melt-processable and being capable of forming the anisotropic phase in the melt state and 0.5 to 70 percent by weight of a plate-like filler, also called as sheet powder.

It is preferable that the filler is inorganic and has an aspect ratio of at least 5 and the longest diameter of 0.1 micron to 3 mm. It may contain a particle material.

The liquid crystal polyester which may be used in the present invention is a melt processable polyester and has properties such that the molecular chains are regularly arranged parallel to each other in a molten state. The state in which molecules are arranged in this way is often called a liquid crystal state or a nemadic phase of a liquid crystal material. Such polymer molecules are generally comprised of polymers which are slender and flat and have considerably high rigidity along the major axis of the molecules and a plurality of chain-extending bonds which are usually in either a coaxial relationship or a parallel relationship with each other.

The properties of the anisotropic molten phase may be examined by a customary polarimetric method using crossed polarizers. More particularly, the anisotropic molten phase can be examined by observing a molten sample placed on a Leitz hot stage in a nitrogen atmosphere at a magnification of 40 under a Leitz polarization microscope. The above-mentioned polymer is optically anisotropic. Namely, when it is placed between crossed polarizers, it permits transmission of a light beam. If the sample is optically anisotropic, the polarized light will be transmitted, even when it is in a static state.

The components of the polymer which forms the anisotropic molten phase as mentioned above are those selected from the group consisting of:

1   at least one member selected from the group consisting of aromatic dicarboxylic acids and alicyclic dicarboxylic acids;

2   at least one member selected from the group consisting of aromatic diols, alicyclic diols, and aliphatic diols;

3   at least one member selected from the group consisting of aromatic hydroxy carboxylic acids;

4   at least one member selected from the group consisting of aromatic thiol carboxylic acids;

5   at least one member selected from the group consisting of aromatic dithiols and aromatic thiol phenols; and 6   at least one member selected from the group consisting of aromatic hydroxy amines and aromatic diamines.

The polymer which forms the anisotropic molten phase is a polyester capable of forming an anisotropic molten phase and comprised of a combination of components such as:

(I) a polyester comprised of the components 1 and 2 ;

(II) a polyester comprised of only the component 3 ;

(III) a polyester comprised of the components 1 , 2 , and 3 ;

(IV) a polythiol-ester comprised of only the component 4 ;

(V) a polythiol-ester comprised of the components 1 and 5 ;

(VI) a polythiol-ester comprised of the components 1 , 4 , and 5 ;

(VII) a polyester-amide comprised of the components 1 , 3 , and 6 ; and (VIII) a polyester-amide comprised of the components 1 , 2 , 3 , and 6 .

Aromatic polyazomethines are also a polymer which forms the anisotropic molten phase, although they are not included in the category of the above-mentioned combinations of components. Particular examples of such aromatic polyazomethines include poly(nitrilo-2-methyl-1,4-phenylenenitriloethylidyne-1,4-phenyleneethylidyne); poly(nitrilo-2-methyl-1,4-phenylenenitrilomethylidyne-1,4-phenylenemethylidyne; and poly(nitrilo-2-chloro-1,4-phenylenenitrilomethylidyne-1,4-phenylenemethylidyne).

Further, polyester carbonates are also a polymer which forms the anisotropic molten phase, although they are not included in the category of the above-mentioned combinations of components. They are comprised essentially of 4-oxybenzoyl units, dioxyphenyl units, dioxycarbonyl units, and terephthaloyl units.

The above-mentioned polyesters I), II), and III) and polyester-amide VIII) which are polymers capable of forming an anisotropic molten phase suitable for use in the present invention may be produced by various ester forming processes in which organic monomer compounds having functional groups capable of forming required repetitive units through condensation are mutually reacted. Examples of the functional groups of these organic monomer compounds include carboxyl group, hydroxyl group, ester group, acyloxy group, acyl halide group, and amino group. The organic monomer compounds can be reacted by a melt acidolysis method in the absence of any heat exchange fluid. According to this mthod, the monomers are first heated together to form a melt of reactants. As the reaction proceeds, solid polymer particles are suspended in the melt. Vacuum may be applied in order to facilitate the removal of volatile matter (e.g., acetic acid or water) which is produced as a by-product in the final stage of the condensation.

Further, a slurry condensation method may also be adopted in forming a liquid crystal aromatic polyester suitable for use in the present invention. In this method, the solid product is obtained in such a state that it is suspended in a heat exchange medium.

In both the above-mentioned melt acidolysis process and slurry polymerization process, the organic monomer reactants from which the liquid crystal polyester is derived may be used in the reaction in a modified form in which the hydroxyl groups of such monomers have been esterified (i.e., in the form of a lower acyl ester). The lower acyl group preferably has 2 to 4 carbon atoms. It is preferred that acetates of the organic monomer reactants be used in the reaction.

Representative examples of the catalyst which can be used at will in both the melt acidolysis and slurry process include dialkyltin oxides (e.g., dibutyltin oxide), diaryltin oxides, titanium dioxide, antimony trioxide, alkoxytitanium silicate, titanium alkoxide, alkali and alkaline earth metal salts of carboxylic acids (e.g., zinc acetate), Lewis acids (e.g., $BF_3$) and gaseous catalysts such as hydrogen halides (e.g., HCl). The amount of the catalyst is generally about 0.001 to 1% by weight, preferably about 0.01 to 0.2% by weight, based on the total weight of the monomers.

The liquid crystal polymers suitable for use in the present invention tend to be substantially insoluble in usual solvents, which renders them unsuitable for use in solution processing. However, as mentioned above, these polymers may be readily processed by ordinary melt processing. Especially preferable liquid crystal polymers are those soluble in pentafluorophenol to some extent.

The liquid crystal polyester suitable for use in the present invention have a weight-average molecular weight of about 2,000 to 200,000, preferably about 10,000 to 50,000, and particularly preferably about 20,000 to 25,000. On the other hand, the wholly aromatic polyester-amide suitable for the present invention has a molecular weight of about 5,000 to 50,000, preferably about 10,000 to 30,000, e.g., 15,000 to 17,000. The molecular weight may be determined by gel permeation chromatography and other standard determination methods which do not involve the formation of a solution of polymers, e.g., by determining the terminal groups by infrared spectroscopy in the form of a compression-molded film. Alternatively, the molecular weight may be determined by a light scattering method in the form of a pentafluorophenol solution.

The above-mentioned liquid crystal polyesters and polyester-amides exhibit an inherent viscosity (I.V.) of at least about 2.0 dl/g, e.g., about 2.0 to 10.0 dl/g, as determined at 60° C. in the form of a solution prepared by dissolving the polymer in pentafluorophenol to have a polymer concentration of 0.1% by weight.

Polyesters which form an anisotropic melt phase suitable for use in the present invnetion are aromatic polyesters and aromatic polyester-amides and may also include polyesters which partially contain aromatic polyester units and aromatic polyester-amide units in the same molecular chain.

Examples of the compounds constituting the above-mentioned polymers include naphthalene compounds such as 2,6-naphthalenedicarboxylic acid, 2,6-dihydroxynaphthalene, 1,4-dihydroxynaphthalene, and 6-hydroxy-2-naphthoic acid, biphenyl compounds such as 4,4'biphenyldicarboxylic acid and 4,4'-dihydroxybiphenyl, compounds represented by the following general formulae (I), (II), or (III):

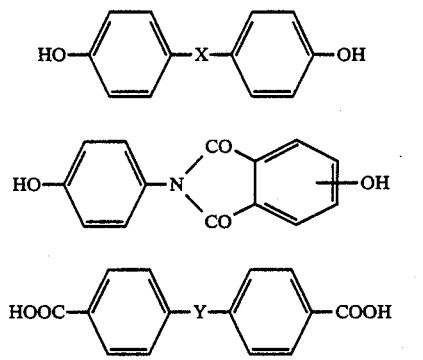

[wherein X is a group selected from among an alkylene (having 1 to 4 carbon atoms), an alkylidene, —O—, —SO—, —SO$_2$—, —S—, and —CO—; and Y is a group selected from —(CH$_2$)$_n$— (wherein n is 1 to 4) and —O(CH$_2$)$_n$O— wherein n is 1 to 4)]; para-substituted benzene compounds such as p-hydroxybenzoic acid, terephthalic acid, hydroquinone, p-aminophenol, and p-phenylenediamine and nucleus-substituted compounds thereof (wherein the substituent is selected from among chlorine, bromine, methyl, phenyl, and 1-phenylethyl); and meta-substituted benzene compounds such as isophthalic acid and resorcinol.

Further, the liquid crystal polyester which is used in the present invention may be a polyester partially containing a polyalkylene terephthalate portion which does not exhibit any anisotropic melt phase in the same molecular chain besides the above-mentioned components. In this case, the alkyl group has 2 to 4 carbon atoms.

Among the polymers comprised of the above-mentioned components, polymers containing at least one member selected from among naphthalene compounds, biphenyl compounds, and para-substituted benzene compounds as essential component are more preferable. Particularly preferable para-substituted benzene compounds include p-hydrobenzoic acid, methylhydroquinone, and 1-phenylethylhydroquinone.

Polyesters capable of forming an anisotropic melt phase which are particularly preferably used in the present invention are those containing about 10 mol % or more of repetitive units containing a naphthalene portion, such as 6-hydroxy-2-naphthoyl, 2,6-dihydroxynaphthalene, and 2,6-dicarboxynaphthalene. Preferable polyester-amides are those containing repetitive units containing the above-mentioned naphthalene portion and a portion comprised of 4-aminophenol or 1,4-phenylenediamine.

Specific examples of the compounds which are components in the above-mentioned polymers (I) to (VIII) and specific examples of polyesters capable forming an anisotropic melt phase and suitable for use in the present invention are described in Japanese Patent Laid-Open No. 69866/1986.

In the present invention, the term "sheet powder" is intended to mean a material having a considerably large planar extension relative to the thickness thereof and include a material which can be macroscopically regarded as having a sheet form even through it has more or less uneven or curved portions. A typical powder having a substantially planar plate form has the following numerical characteristic. Specifically, it exhibits in the form of a composition an aspect ratio (average major diameter to average thickness ratio) of at least 5, preferably 10 to 200, particularly preferably 15 to 100. The average major diameter of the sheet powder in the composition varies depending upon the material. However, the average diameter of the plate surface is generally 0.1 μm to 3 mm, preferably 1 μm to 1 mm. For example, a suitable average major diameter is 0.1 μm to 500 μm in the case of mica and 10 μm to 2 mm in the case of glass flake. A sheet powder having a small major diameter or a small aspect ratio is undesirable because it can not bring about any satisfactory effect. Further, a sheet powder having an excessively large aspect ratio unfavorably spoils the moldability.

Specific examples of the sheet powder mainly include inorganic materials such as mica, glass, sericite, talc, kaolinite, pyrophyllite, graphite, and metals.

In the composition of the present invention, it is preferred from the standpoint of balance among physical properties that the above-mentioned sheet powder be contained in combination with a fibrous material.

Examples of the fibrous material useful for the present invention include glass fiber, carbon fiber, graphitized fiber, whisker, metallic fiber, inorganic fiber, synthetic fiber, mineral fiber, and various organic fibers such as natural fibers.

Specific examples of the fibrous material are as follows.

Examples of the glass fiber include not only ordinary glass fibers but also those coated with a metal such as nickel or copper, silane fiber, aluminosilicate glass fiber, hollow glass fiber, and non-hollow fiber. Examples of the carbon fiber include PAN fiber prepared by making use of polyacrylonitrile as the starting material and pitch fiber prepared by making use of pitch as the starting material.

Examples of the whisker include silicon nitride whisker, silicon oxynitride whisker, basic magnesium sulfate whisker, barium titanate whisker, silicon carbide whisker, and boron whisker. Examples of the metallic fiber include fibers made of mild steel, stainless steel, steel and its alloy, brass, aluminum and its alloy, and lead.

Examples of the inorganic fiber include various fibers made of rock wool, zirconia, alumina/silica, potassium titanate, barium titanate, silicon carbide, alumina, silica, and blast furnace slag. Examples of the synthetic fiber include aramid fiber which is a wholly aromatic polyamide and Kynol which is a phenolic resin fiber.

Examples of the mineral fiber include asbestos and wollastonite. Examples of the natural fiber include cellulose fiber and hemp yarn.

It is preferred that the fiber have a suitably small length to diameter ratio. For example, when the diameter is about 10 μm, the average length of the fiber is 30 μm to 10 mm, preferably 50 to 700 μm. That is, it is preferred that the fiber have an aspect ratio (average length to average diameter ratio) of 5 to 70. The amount of the fibrous material added is preferably 0 to 60% by weight based on the total weight of the composition. However, the use of the sheet powder in combination with the fibrous material in an amount exceeding 70% by weight in terms of the total weight of the two materials based on the total weight of the composition is undesirable from the standpoint of moldability and strength.

A particulate material may be further added to the composition of the present invention in such an amount as will not remarkably spoil the moldability of the composition. The term "particulate material" as used herein is intended to mean a material which does not extend in any particular direction. Specific examples of the particulate material include silicates such as kaolin, clay, vermiculite, calcium silicate, aluminum silicate, feldspar powder, acid clay, agalmatolite clay, sericite, illimanite, bentonite, glass powder, glass bead, slate powder, and silane; carbonates such as calcium carbonate, chalk, barium carbonate, magnesium carbonate, and dolomite; sulfates such as baryte powder, blanc fixe, precipitated calcium sulfate, plaster of Paris, and barium sulfate; hydroxides such as hydrated alumina; alumina, antimony oxide, magnesia, titanium oxide, chinese white, silica, silica sand, quartz, white carbon, and diatomite; sulfides such as molybdenum disulfide; particulate metal; organic high-molecular materials such as fluorocarbon resin; organic low-molecular material such as brominated diphenyl ether; finely divided glass fiber; spherical fiber or fiber having a small length to diameter ratio; and sheet powder having small diameter and thickness.

Since the composition of the present invention is molded with a usual plastics molding machine, there is a possibility that the additive is crushed during the molding. In view of the above possibility, it is necessary to use a material which will maintain the plate or fibrous form even after crushing or a material having a large average diameter so as to maintain the plate or fibrous form even after crushing.

The effect of the present invention will now be substantiated by a simple model test.

Various additives such as sheet powder were added to a liquid crystal polyester resin A, which will be described later to determine the molding shrinkage. Some of the results are shown in Table 1.

The molding shrinkage was determined as follows. A flat plate having a width of 50 mm, a length of 45 mm and a thickness of 2 mm as shown in FIG. 1 was prepared. A through-hole having a diameter of 14 mm of which the center is located at a position 12 mm apart from the width side and 14 mm apart from the length side of the plate was formed to prepare a test molded article comprised of a bored flat plate. The flatness of the plate and the roundness of the through-hole were measured. The test molded article was provided with a 1.5-mm pin gate at a position of an arrow 1 as shown in FIG. 1.

The flatness and roundness were both measured according to JIS B 0621.

The results are shown in Table 1. The effect of the additives will now be compared with each other in terms of the same amount of addition (% by weight). Although the addition of a fiber such as glass fiber brings about an improvement in tensile strength over that attained by other additives, it spoils both the roundness and flatness. The addition of a particulate material such as glass bead lowers the tensile strength, brings about little or no improvement in the roundness, and lowers the flatness. On the other hand, the addition of sheet powder such as glass flake, mica flake, or talc, brings about a remarkable improvement in both the roundness and flatness. However, the sheet powder causes slight lowering in the tensile strength although the degree of the lowering is not as large as that caused by the addition of the glass bead. The lowering to such an extent is not fatal because the liquid crystal polyester originally has high strength. However, when the improvement in the tensile strength is required, it is preferred that the sheet powder is used in combination with a fiber such as glass fiber as will be described later. This combined use not only brings about the synergism of the sheet powder and the fiber with respect to a specific molding shrinkage reducing action but also contributes to the lowering in the strength more strongly than that caused by the use of the particulate material.

With respect to moldings of other crystalline resins free from additives incorporated therein, e.g., polybutylene terephthalate and polyacetal, they originally exhibit little or no anisotropy, and the addition of a fibrous additive such as glass fiber or a particulate additive such as glass bead imparts anisotropy to the resins. On the other hand, with respect to the liquid crystal polyester, the combination thereof with any of the particulate material, sheet powder and fibrous material decreases the anisotropy of the moldings as opposed to other plastics.

TABLE 1

| powder | amt. of addn. *1 (wt %) | form | roundness (μm) | flatness (μm) | tensile strength (kg/cm²) |
|---|---|---|---|---|---|
| none | — | — | 43 | 427 | 2100 |
| GF*2 | 30 | fibrous | 54 | 239 | 2200 |
| GFL*3 | 30 | sheet | 25 | 179 | 1540 |
|  | 50 | " | 19 | 136 | 1200 |
| MFL (A)*4 | 30 | " | 24 | 156 | 1300 |
|  | 50 | " | 12 | 126 | 880 |
| MFL (B)*4 | 30 | " | 29 | 168 | 1200 |
|  | 50 | " | 13 | 130 | 350 |
| MFL (C)*4 | 30 | " | 27 | 155 | 1300 |
|  | 50 | " | 16 | 110 | 750 |
| talc (A)*5 | 30 | " | 44 | 166 | 1670 |
|  | 50 | " | 30 | 132 | 1210 |
| talc (B)*5 | 30 | " | 39 | 162 | 1630 |
|  | 50 | " | 26 | 120 | 770 |
| GB*6 | 30 | particulate | 42 | 205 | 660 |
|  | 50 | " | 34 | 112 | 460 |

Note:
*1the amount of addition based on the total amount of the composition
*2GF: glass fiber (an average thickness of 10 μm; an average length of 4.7 mm)
*3GFL: glass flake (an average thickness of 150 μm; an average length of 4 μm)
*4MFL: mica flake
(A) (an average diameter of 8.0 μm; an average thickness of 0.2 μm)
(B) (an average diameter of 2.5 μm; an average thickness of 0.2 μm)
(C) (an average diameter of 8.0 μm; an average thickness of 0.2 μm) (treated with aluminosilane)
*5talc
(A) (an average diameter of 10 μm; an average thickness of 1 μm)
(B) (an average diameter of 2.5 μm; an average thickness of 0.2 μm)
*6GB: glass bead (an average particle diameter of 19 μm)

The larger the amount of the sheet powder added, the better the effect of preventing the molding shrinkage. However, the use in an excessive amount spoils the moldability, which leads to the lowering in the mechanical strength of the molded article. Therefore, the amount of the sheet powder added is 0.5 to 70% by weight, preferably 10 to 50% by weight based on the total amount of the composition.

As mentioned above, the combined use of the sheet powder and fibrous filler is preferable in the case of molded article in which slight lowering in the strength due to the addition of only the sheet powder raises a problem. As can be seen in Table 2, the combined use leads to well-balanced properties of the molded article in respect of low deformation and high strength.

TABLE 2

|  | roundness (μm) | flatness (μm) | tensile strength (kg/cm²) |
| --- | --- | --- | --- |
| GFL (30) GF (20) | 36 | 116 | 1510 |
| GFL (30) CF*¹ (20) | 34 | 91 | 1510 |
| MFL*² (30) GF (20) | 31 | 110 | 990 |
| MFL*² (30) CF*¹ (20) | 32 | 95 | 1300 |

Note:
*¹CF: carbon fiber
*²MFL: mica flake (C) as shown in Table 1 The other symbols are as defined in Table 1.
*figure in ( ) represents the content in terms of % by weight based on the composition.

Although the particulate material contributes to an improvement in the flatness, it exhibits no effect with respect to an improvement in the roundness and brings about a great degree of lowering in the strength. Therefore, care should be taken of the amount of the particulate material used. However, since the particulate material exhibits an effect of improving the flatness, it can reduce the amount of the sheet powder to be added to some extent.

The additive may be used for the purpose of attaining effects characteristic of powdery additive, such as improvements in electrical conductivity, flame retardancy, or frictional properties.

Although the sheet powder, fibrous material, and particulate material useful for the present invention may be used alone, it is possible and desirable to use them in combination with commonly used known surface treatments and binders.

Examples of the surface treatments include functional compounds such as epoxy compounds, isocyanate compounds, silane compounds, and titanium compounds.

These compounds may be used in such a manner that the above-mentioned additives are subjected to a surface treatment or binding treatment with these compounds. Alternatively, these compounds may be added together with the above-mentioned additives in preparing the composition. These treatments are effective in improving the physical properties and flowability. The base resins and the above-mentioned various additives may be used alone or in the form of a mixture of two or more of them.

Further, the liquid crystal polyester of the present invention may be in the form of a polymer blend with other thermoplastic resins in such an amount as will not spoil the purpose of the present invention.

The thermoplastic resins used in this case are not particularly limited. Examples of the thermoplastic resins include polyolefins such as polyethylene and polypropylene, aromatic polyesters comprised of an aromatic dicarboxylic acid and a diol or a hydroxycarboxylic acid, such as polyethylene terephthalate and polybutylene terephthalate, polyacetal (homopolymer or copolymer), polystyrene, polyvinyl chloride, polyamide, polycarbonate, ABS, polyoxyphenylene oxide, polyoxyphenylene sulfide, and fluorocarbon resin. These thermoplastic resins may be used in the form of a mixture of two or more of them. Further, if necessary, various additives may be added to these resins in order to improve various properties such as mechanical, electrical, and chemical properties and flame retardancy.

For example, known materials which are added to general thermoplastic resins and thermosetting resins, i.e., plasticizers, stabilizers such as antioxidants and ultraviolet absorbers, antistatic agents, surfactants, flame retardants, coloring materials such as dyes and pigments, lubricants for improving the flowability and releasability, and crystallization promoters (nucleating agents) can be used at will according to the requirements for properties.

The composition of the present invention can be prepared by customary methods which are used for conventional reinforced resins, filled resins, etc. Preferred examples of the methods include a method which comprises mixing individual additives and extruding the mixture with an extruder to prepare pellets having a composition of the present invention and molding the pellets (in this method the fiber may be bound, unbound, filament or other suitable fiber), a method in which pellets having different compositions of materials incorporated therein are mixed when they are molded, and a method in which the components are each directly fed in a molding machine.

[EFFECT OF THE INVENTION]

As is apparent from the foregoing description, the present invention has been made based on a finding that the incorporation of sheet powder in a liquid crystal polyester specifically reduces the anisotropy of molding shrinkage. According to the present invention, a composition which is less susceptible to deformation and is hardly available by the addition of either a fibrous material or a particulate material alone can be obtained. In general, a liquid crystal polyester has a drawback that the surface of the moldings is fluffed up due to the friction during the use thereof. On the contrary, the composition of the present invention has an elegant and smooth surface without causing fibrillar burrs (fluff) due to the friction.

The composition in which only a fiber is incorporated gives rise to flow marks like moiré fringes on the surface of moldings, which leads to a poor appearance. On the other hand, not only a composition in which only a sheet powder is incorporated but also a composition in which the sheet powder is incorporated in combination with a fiber brings about a reduction in the occurrence of such flow marks.

A liquid crystal polyester originally exhibits a small molding shrinkage factor. The composition of the present invention exhibits smaller anisotropy when it is injection molded into moldings, and the molding shrinkage factor is smaller in any portion and any direction. This enables precision molding and also leads to an advantage that moldings having an excellent dimensional accuracy can be obtained.

Further, the present invention has a great advantage that the above improvement can be attained while scarcely spoiling the features of the liquid crystal polyester, i.e., high mechanical strength, high melt flowability, high melting point, and high heat resistance.

Moreover, although the use of the sheet powder brings about slight lowering in strength,, the strength is still higher than that of other plastics. When a composition is used in an application where such a small degree of lowering in strength raises a problem, the use of the sheet powder in combination with a fibrous material provides a composition having satisfactory physical properties.

DETAILED DESCRIPTION OF THE INVENTION

The present invention will now be described in more detail with reference to the following examples. However, the present invnetion is not limited to the combinations of the components as described in the examples.

EXAMPLES 1 to 25

Mixtures respectively containing liquid crystal polyester resins A, B, C, D, and E as bases which will be mentioned later and having compositions as shown in Table 3 were extruded to prepare pellets.

Figure 2:
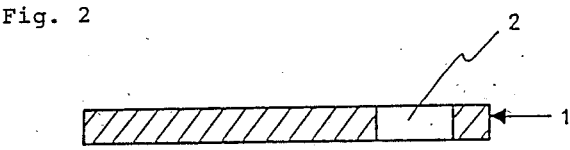
FIG. 2 is a schematic cross-sectional view taken along the line II—II of FIG. 1.

Each material thus prepared was molded into a flat plate specimen having a hole as shown in FIGS. 1 and 2. The roundness and flatness were measured in the same manner as described before.

The presence of the surface burrs (fluffs) was determined by a method which comprises rubbing the above specimen while pressing the surface of the specimen five times with a finger and observing the rubbed surface of the specimen to examine the presence of fibrillar burrs. In the following tables, the fibrillar burrs are expressed simply as "burrs".

The results are shown in Table 3.

TABLE 3

| | | filler | | | | |
|---|---|---|---|---|---|---|
| | resin | kind | amt. of addn.* (wt %) | roundness (μm) | flatness (μm) | tensile strength (kg/cm$^2$) | burrs |

| Example | resin | kind | amt. of addn.* (wt %) | roundness (μm) | flatness (μm) | tensile strength (kg/cm$^2$) | burrs |
|---|---|---|---|---|---|---|---|
| 1 | A | | | 23 | 153 | 1390 | none |
| 2 | B | | | 22 | 154 | 1310 | " |
| 3 | C | GFL | 40 | 20 | 148 | 1320 | " |
| 4 | D | | | 25 | 150 | 1410 | " |
| 5 | E | | | 21 | 145 | 970 | " |
| 6 | A | | | 20 | 126 | 990 | " |
| 7 | B | | | 19 | 123 | 960 | " |
| 8 | C | MFL | 40 | 21 | 125 | 930 | " |
| 9 | D | | | 23 | 130 | 1010 | " |
| 10 | E | | | 19 | 120 | 710 | " |
| 11 | A | | | 40 | 101 | 1500 | " |
| 12 | B | GFL | 25 | 43 | 100 | 1510 | " |
| 13 | C | GF | 15 | 40 | 98 | 1490 | " |
| 14 | D | | | 40 | 99 | 1530 | " |
| 15 | E | | | 38 | 97 | 1050 | " |
| 16 | A | | | 37 | 99 | 1520 | " |
| 17 | B | GFL | 25 | 36 | 100 | 1480 | " |
| 18 | C | CF | 15 | 35 | 97 | 1430 | " |
| 19 | D | | | 34 | 96 | 1550 | " |
| 20 | E | | | 34 | 95 | 1046 | " |
| 21 | A | | | 37 | 97 | 1100 | " |
| 22 | B | GFL | 20 | 35 | 97 | 1050 | " |
| 23 | C | S | 20 | 35 | 95 | 1120 | " |
| 24 | D | | | 36 | 98 | 1260 | " |
| 25 | E | | | 34 | 94 | 1100 | " |

COMPARATIVE EXAMPLES 1 to 5

The same tests as in the above-mentioned examples were conducted using resins A, B, C, D, and E without incorporating any filler.

The results are shown in Table 4.

TABLE 4

| Comp. Ex. | resin | roundness (μm) | flatness (μm) | tensile strength (kg/cm$^2$) | burrs |
|---|---|---|---|---|---|
| 1 | A | 43 | 427 | 1700 | observed |
| 2 | B | 40 | 374 | 1500 | " |
| 3 | C | 45 | 406 | 1600 | " |
| 4 | D | 45 | 440 | 2100 | " |
| 5 | E | 39 | 411 | 1430 | " |

The resins A to E were respectively comprised of the following structural units:

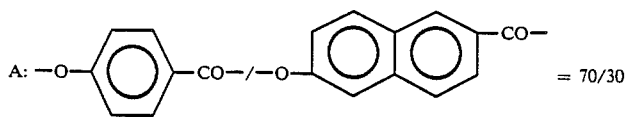

A: = 70/30

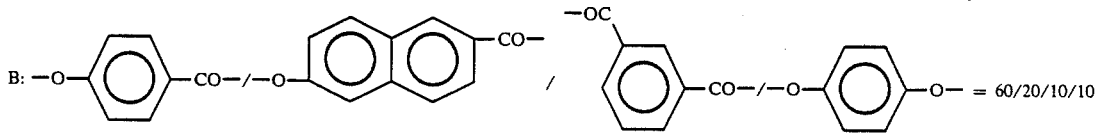

B: = 60/20/10/10

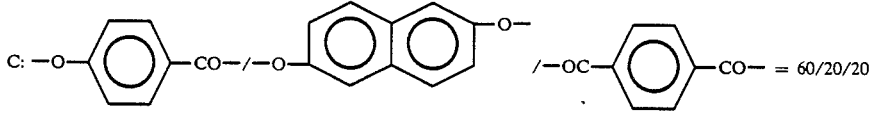

C: = 60/20/20

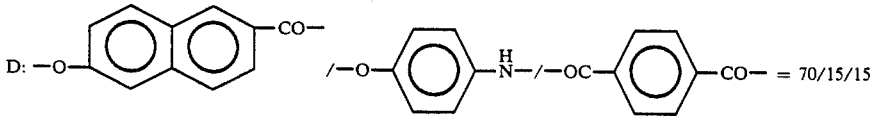

D: = 70/15/15

-continued

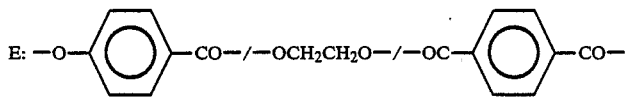

1 = 60/20/20

As is apparent from the results of the above-mentioned examples and comparative examples and Table 1, the compositions prepared by incorporating a sheet powder or a combination of a sheet powder with a fibrous material in a liquid crystal polyester is superior to the compositions prepared by incorporating either a fibrous material or a particulate material alone in the liquid crystal polyester in that the composition can decrease the anisotropy of the molding shrinkage factor without sacrificing high strength and high stiffness inherent in a liquid crystal polyester and further enables the production of moldings having excellent surface condition.

We claim:

1. A liquid crystal polyester composition which comprises 99.5 to 30 percent by weight of a polyester of a type which is melt processable and which displays anisotropy in the molten state and 0.5 to 70 percent by weight of the total weight of the composition of a plate-like inorganic filler, which has an aspect ratio of at least 5 and a longest diameter of 0.1 micron to 3 mm.

2. The composition as claimed in claim 1, in which the aspect ratio of the filler is in the range of 10 to 100.

3. The composition as claimed in claim 1, in which the amount of the filler is 10 to 50 percent by weight of the total weight of the composition.

4. The composition as claimed in claim 1, in which said filled is selected from the group consisting of mica, glass, sericite, talc, kaolinite, pyrophyllite, graphite and a metallic powder.

5. The composition as claimed in claim 1, which further comprises up to 60 percent by weight of the total weight of the composition of a fibrous material.

6. The composition as claimed in any one of claims 1 or 2-5, which further comprises a particulate material of a type in which the particles are not plate-like or fibrous.

7. The composition as claimed in claim 6, in which said particulate material is selected from the group consisting of alumina, silica, barium sulfate, glass, an organic high molecular material and an organic low molecular material.

8. The composition as claimed in claim 2, in which the amount of the filler is 10 to 50 percent by weight of the total weight of the composition.

9. The composition as claimed in claim 2, in which said filler is selected from the group consisting of mica, glass, sericite, talc, kaolinite, pyrophyllite, graphite and a metallic powder.

10. The composition as claimed in claim 3, in which said filler is selected from the group consisting of mica, glass, sericite, talc, kaolinite, pyrophyllite, graphite and a metallic powder.

11. The composition as claimed in claim 8, in which said filler is selected from the group consisting of mica, glass, sericite, talc, kaolinite, pyrophyllite, graphite and a metallic powder.

12. The composition as claimed in claim 2, which further comprises up to 60 percent by weight of the total weight of the composition of a fibrous material.

13. The composition as claimed in claim 3, which further comprises up to 60 percent by weight of the total weight of the composition of a fibrous material.

14. The composition as claimed in claim 4, which further comprises up to 60 percent by weight of the total weight of the composition of a fibrous material.

15. The composition as claimed in claim 8, which further comprises up to 60 percent by weight of the total weight of the composition of a fibrous material.

16. The composition as claimed in claim 9, which further comprises up to 60 percent by weight of the total weight of the composition of a fibrous material.

17. The composition as claimed in claim 10, which further comprises up to 60 percent by weight of the total weight of the composition of a fibrous material.

18. The composition as claimed in claim 11, which further comprises up to 60 percent by weight of the total weight of the composition of a fibrous material.

19. The composition as claimed in claim 5, in which the fibrous material is selected from the group consisting of glass fiber, carbon fiber, whisker, metallic fiber, inorganic fiber, synthetic fiber and natural organic fiber and which comprises not more than 70 percent by weight of the total weight of the composition of the filler and the fibrous material.

20. The composition as claimed in any one of claims 6 or 15-21, in which the fibrous material is selected from the group consisting of glass fiber, carbon fiber, whisker, metallic fiber, inorganic fiber, synthetic fiber and natural organic fiber.

21. The composition as claimed in any one of claims 6 or 15-21, which comprises not more than 70 prcent by weight of the total weight of the compositions of the filler and the fibrous material.

* * * * *